UNITED STATES PATENT OFFICE.

WILLIAM B. DAVIES, OF BROOKLYN, NEW YORK.

IMPROVEMENT IN COMPOUNDS FOR COATING ROOFING-FABRICS, FLOOR-COVERINGS, &c.

Specification forming part of Letters Patent No. 128,599, dated July 2, 1872.

*To all whom it may concern:*

Be it known that I, WILLIAM B. DAVIES, of Brooklyn, in the county of Kings and State of New York, have invented a new and Improved Compound for Roofing, Floor-Covering, &c.; and I do hereby declare the following to be a full, clear, and exact description thereof, which will enable those skilled in the art to make and use the same.

This invention consists in a compound made of the gummy residuum of palm-oil mixed with pulverized slate or other equivalent material, and with or without asphaltum; said compound being spread upon paper, felt, cloth, or other material in such a manner that a material is produced which is strong, durable, impervious to water, and fire-proof; the gummy residuum of palm-oil serving to impart to the whole strength and elasticity.

In carrying out my invention I take the gummy residuum of palm-oil and mix it with pulverized slate in about the following proportions: Residuum of palm-oil, seventy-five parts; pulverized slate, twenty-five parts; or, if I wish to use asphaltum in this compound, the proportion in which I mix the ingredients is about as follows: Residuum of palm-oil, fifty parts; pulverized slate, twenty-five parts; asphaltum, twenty-five parts. In place of slate I have used with equal advantange ocher or any other refractory earthy substance.

The ingredients while being mixed are heated sufficiently to keep the residuum of palm-oil and the asphaltum in a fluid state, and when they are thoroughly mixed, so as to form a homogeneous mass, the compound, while hot and semi-fluid, is spread upon paper, felt, cloth, or other suitable flexible material.

The gummy residuum of palm-oil, while in a semi-fluid state, penetrates the fibers of the paper or other supporting material; and the compound, when cold, adheres to said supporting material with great tenacity, while it preserves at the same time a considerable degree of elasticity and toughness, so that my material, when properly prepared and coated, can be used with great advantage as a covering for roofs, or as a floor-covering, or for all purposes of a similar nature.

What I claim as new, and desire to secure by Letters Patent, is—

A material produced by spreading upon paper, felt, cloth, or other fabric, a compound made substantially in the manner herein set forth.

W. B. DAVIES.

Witnesses:
W. HAUFF,
E. G. KASTENHUBER.